US010763742B2

(12) United States Patent
Gupta et al.

(10) Patent No.: US 10,763,742 B2
(45) Date of Patent: Sep. 1, 2020

(54) CONTROL OF VOLTAGE SOURCE CONVERTERS

(71) Applicant: General Electric Technology GmbH, Baden (CH)

(72) Inventors: Robin Gupta, Stafford (GB); Carl Barker, Stone (GB); Robert Whitehouse, Stafford (GB); Andrzej Adamczyk, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/563,342

(22) PCT Filed: Mar. 30, 2016

(86) PCT No.: PCT/EP2016/056942
§ 371 (c)(1),
(2) Date: Sep. 29, 2017

(87) PCT Pub. No.: WO2016/156416
PCT Pub. Date: Oct. 6, 2016

(65) Prior Publication Data
US 2018/0069469 A1 Mar. 8, 2018

(30) Foreign Application Priority Data

Mar. 30, 2015 (EP) .................................. 15161748

(51) Int. Cl.
*H02M 7/483* (2007.01)
*H02M 1/32* (2007.01)
*H02J 3/36* (2006.01)
(52) U.S. Cl.
CPC ................. *H02M 1/32* (2013.01); *H02J 3/36* (2013.01); *H02M 7/483* (2013.01);
(Continued)

(58) Field of Classification Search
CPC ............ H02M 7/42; H02M 7/44; H02M 7/48; H02M 7/483; H02M 7/49; H02M 7/537;
(Continued)

(56) References Cited

U.S. PATENT DOCUMENTS

2013/0128636 A1* 5/2013 Trainer ................. H02J 3/1857
363/65
2013/0148392 A1* 6/2013 Inoue ...................... H02M 7/10
363/68
(Continued)

FOREIGN PATENT DOCUMENTS

CN 102640375 A 8/2012
CN 102780200 A 11/2012
(Continued)

OTHER PUBLICATIONS

Extended European Search Report and Opinion issued in connection with corresponding EP Application No. 15161748.7 dated Jul. 24, 2015.
(Continued)

*Primary Examiner* — Gary L Laxton
*Assistant Examiner* — Ivan Laboy
(74) *Attorney, Agent, or Firm* — Eversheds Sutherland (US) LLP

(57) ABSTRACT

A method and apparatus for controlling a fault blocking voltage source converter apparatus which is, in use, connected to an AC system and a DC system for power transmission, in the event of a DC side interruption operating the voltage source converter apparatus after identification of a need for a DC side interruption based on a voltage order, so as to extract at least some electrical energy stored in the connected DC system to the voltage source converter apparatus.

20 Claims, 11 Drawing Sheets

(52) U.S. Cl.
CPC .. *H02J 2003/365* (2013.01); *H02M 2001/322* (2013.01); *H02M 2007/4835* (2013.01); *Y02E 60/60* (2013.01)

(58) Field of Classification Search
CPC ...... H02M 7/5387; H02M 7/797; H02M 1/32; H02M 2007/4835; H02M 2001/322; H02M 2001/325; H02H 7/122; H02H 7/125; H02J 3/36
See application file for complete search history.

(56) References Cited

U.S. PATENT DOCUMENTS

| | | | | |
|---|---|---|---|---|
| 2013/0193766 A1* | 8/2013 | Irwin | .................... | H02H 7/268 307/82 |
| 2013/0308235 A1* | 11/2013 | Davies | ................ | H02H 7/1257 361/62 |
| 2016/0094117 A1* | 3/2016 | Hu | ........................ | H02M 1/32 363/51 |
| 2017/0070047 A1* | 3/2017 | Shen | ........................ | H02J 3/36 |
| 2018/0115253 A1* | 4/2018 | Whitehouse | .......... | H02M 7/483 |
| 2018/0212533 A1* | 7/2018 | Nami | ..................... | H02M 1/32 |

FOREIGN PATENT DOCUMENTS

| | | |
|---|---|---|
| CN | 103339814 A | 10/2013 |
| EP | 2 602 927 A2 | 6/2013 |
| WO | 2011/012174 A1 | 2/2011 |
| WO | 2012/103936 A1 | 8/2012 |

OTHER PUBLICATIONS

International Search Report and Written Opinion issued in connection with corresponding PCT Application No. PCT/EP2016/056942 dated May 27, 2016.

International Preliminary Report on Patentability issued in connection with corresponding PCT Application No. PCT/EP2016/056942 dated Oct. 3, 2017.

Machine Translation and First Office Action and Search issued in connection with corresponding CN Application No. 201680019706.X dated Jan. 3, 2019.

\* cited by examiner

CONTROL OF VOLTAGE SOURCE CONVERTERS

FIELD OF INVENTION

Embodiments of the invention relate to a method and apparatus for control of voltage source converters in the event of a DC side interruption such as a DC side fault, and especially to control of voltage source converters with fault blocking capability.

BACKGROUND OF THE INVENTION

HVDC (high-voltage direct current) electrical power transmission uses direct current for the transmission of electrical power. This is an alternative to alternating current electrical power transmission which is more common. There are a number of benefits to using HVDC electrical power transmission. HVDC is particularly useful for power transmission over long distances and/or interconnecting alternating current (AC) networks that operate at different frequencies.

To date most HVDC transmission systems have been based on line commutated converters (LCCs), for example such as a six-pulse bridge converter using thyristor valves. LCCs use elements such as thyristors that can be turned on by appropriate trigger signals and remain conducting as long as they are forward biased.

Increasingly however voltage source converters (VSCs) are being proposed for use in HVDC transmission. VSCs use switching elements such as insulated-gate bipolar transistors (IGBTs) that can be controllably turned on and turned off independently of any connected AC system. VSCs are thus sometime referred to as self-commutating converters.

Various designs of VSC are known. Typically each VSC will have a phase limb for each AC phase, with each phase limb having two converter arms connecting the relevant AC terminal to respective high and low DC terminals. Each converter arm comprises an apparatus, often referred to as a valve, for selectively connecting the AC terminal to the relevant DC terminal.

In one form of known VSC, often referred to as a six pulse bridge or as a two-level converter, the valve of each converter arm comprises a set of series connected switching elements, typically IGBTs, each IGBT connected with an antiparallel diode. The IGBTs of the valve are switched together to connect or disconnect the relevant AC and DC terminals, with the valves of a given phase limb being switched in antiphase. By using a pulse width modulated (PWM) type switching scheme for each arm, conversion between AC and DC voltage can be achieved. In another form of VSC referred to as a modular multilevel converter (MMC) each converter arm comprises a plurality of series connected cells that each have an energy storage element such as a capacitor that can be selectively connected in series between the relevant AC and DC terminals or bypassed. By using a relatively large number of cells and timing the switching appropriately the valve can synthesise a stepped waveform that approximates to a sine wave, to convert from DC to AC or vice versa with low levels of harmonic distortion. In a further type of converter referred to as an Alternate-Arm-Converter (AAC) a plurality of series connected cells is connected in each converter arm for providing a stepped voltage waveform as described for the MMC type converter but each converter arm also comprises an arm switch, referred to as a director switch and each converter arm is turned off for at least part of the AC cycle.

SUMMARY OF INVENTION

FIG. 1 illustrates an example of an HVDC network. A first VSC 101a, which may form part of a first converter station, is connected to a second VSC 101b by a DC link 102. In a back-to-back arrangement the second VSC 101b may be co-located in the first station with the first VSC 101a. However in some instances the second VSC 101b may be located in a second station which is remote from the first and the DC link 102 may comprise one or more DC transmission lines e.g. overhead lines or subsea or buried cables, which may be many kilometres in length. The first VSC 101a may generate a DC supply by conversion from a received AC input supply from a connected AC system 103a. The second VSC 101b then typically provides conversion back from DC to AC for a connected AC system 103b.

Initially HVDC power transmission systems tended to be implemented for point-to-point transmission, i.e. from a first station to a second station. Increasingly however it is being proposed to implement HVDC power transmission on a multi-terminal DC grid comprising a plurality of DC transmission paths connecting more than two voltage converters. Thus in some instances there may be at least a third VSC 101c connected to the DC grid, i.e. to DC link 102. The third VSC, if present, may be coupled to a third AC system 103c (which may be part of the same AC network as the first or second AC systems). Such DC networks are useful, for example, in applications such as electrical power generation from renewable sources such as wind farms where there may be a plurality of sources that may be geographically remote.

Such networks need to be able to handle faults which may include DC side faults. A DC side fault represents a DC side interruption in the normal or nominal operation of the network. In the event of a DC fault a fault current may flow from a pole of the DC link to ground, illustrated by grey arrow 107, or between poles of the DC link, as illustrated by arrow 108.

Conventionally AC breakers 104 are provided for fault handling. In the event of a DC fault the VSC may be switched into a blocked state, i.e. all the switching elements of the VSC may be opened. For many conventional VSC designs however a fault current may still flow through the VSC in a blocked state via the diodes of the switching elements of the VSC. Thus to prevent such contribution to the DC side fault current the AC breaker 104 would be commanded to open, and would open at a subsequent zero crossing of the AC current. Opening the AC breaker isolates the DC system from the AC system and thus prevents any contribution to the fault current from the AC side.

Operating the AC breaker does isolate the AC and DC systems in the event of a fault but this will require the AC breaker to be reclosed after the fault has been cleared.

The use of DC breakers 105 has also been proposed for DC side fault handling, but DC breakers capable of breaking the full DC current flowing in an HVDC system in a fault situation can be expensive and bulky components.

Recently some VSCs have been proposed that have fault blocking capability. Such VSCs typically include energy storage elements such as capacitors that can be selectively connected into the converter arms of the VSC to provide a blocking voltage. Such VSCs will be referred to herein as fault blocking VSCs.

FIG. 2 illustrates one example of a modular multilevel converter (MMC) type VSC 200. FIG. 2 illustrates a VSC with three phase limbs 201a, 201b, 201c each having high and low side converter arms respectively between the relevant AC terminal 202a, 202b, 202c and the respective DC terminal DC+, DC−. Each converter arm comprises a set 203 of cells 204 connected in series, each cell comprising an energy storage element, such as a capacitor 206, and an arrangement of switches 207 that can be controlled so as to either connect the energy storage element in series between the terminals of the cell or bypass the energy storage element. The set 203 of series connected cells 204 is sometimes referred to as a chain-link converter or chain-link circuit or simply a chain-link.

The cells 204 of the chain-link are sometimes referred to as sub-modules, with a plurality of cells forming a module. As mentioned above in normal operation the cells are controlled in use, e.g. by a controller 208, to connect or bypass their respective energy storage element at different times so as to vary over the time the voltage difference across the whole chain-link. FIG. 2 illustrates just a few such cells 204 for clarity but in practice there may be many tens or even hundreds of cells.

An MMC may be implemented as a half-bridge MMC where the energy storage element of a cell or sub-module is connected with a half-bridge switch arrangement, to allow the energy storage element to be bypassed or connected to provide a voltage of a given polarity at the terminals of the cell.

However to provide a fault blocking capability at least some of the cells 204 of the chain-link 203 are connected with a full-bridge switch arrangement, sometimes referred to as an H-bridge, as illustrated in FIG. 2, which allows the energy storage element to be bypassed or connected to provide a voltage of either polarity at the terminals of the cell. In some embodiments all the cells of the chain-link of an MMC may be full-bridge cells. In normal operation however the conduction losses are greater for a full-bridge cell than for a half-bridge cell. In some embodiments therefore a chain-link may comprise a plurality of full bridge cells along with a plurality of half-bridge cells.

FIG. 3 illustrates an AAC type where components similar to those illustrated in FIG. 2 are thus identified using the same reference numerals. In the AAC converter the chain-link 203 in each converter arm is connected in series with an arm switch 301, also referred to as a director switch, which may comprise a plurality of series connected arm switching elements 302. The director switch of an arm may for example comprise high voltage elements with turn-off capability such as IGBTs or the like with antiparallel diodes. When a particular converter arm is conducting, the chain-link 203 is switched in sequence to provide a desired waveform in a similar fashion as described above with respect to the MMC type converter. However in the AAC converter each of the converter arms of a phase limb is switched off for part of the AC cycle and during such a period the director switch 301 is turned off.

For an AAC converter the cells 204 of the chain-link 203 are typically cells having a full H-bridge arrangement of switches 207, as illustrated in FIG. 3 and thus the AAC type converter also typically provides a fault blocking capability.

For fault blocking VSCs, such as those illustrated in FIG. 2 or 3, in the event of a DC fault the converter may be blocked, i.e. the switching elements of each cell turned-off. In this instance however the full-bridge H cells offer no direct flow path between the terminals of the cell when in a blocked state and any fault current would have to flow via the cell capacitor, the voltage of which acts to oppose current flow. Thus switching such a fault blocking VSC to a blocked state has the effect of blocking any AC side contribution to the fault current.

Embodiments of the present disclosure relate to methods and apparatuses for control of fault blocking VSCs that provide for improved response for DC side interruptions, such as DC side faults.

Thus according to embodiments of the present invention there is provided a method of controlling a fault blocking voltage source converter apparatus which is, in use, connected to an AC system and a DC system for power transmission, the method comprising, in the event of a DC side interruption:

operating the voltage source converter apparatus after identification of a need for a DC side interruption based on a voltage order so as to extract at least some electrical energy from the DC system to the voltage source converter apparatus.

A voltage source converter apparatus may comprise a single voltage source converter, i.e. the method may be a method of controlling a fault blocking voltage source converter. In some embodiments however the fault blocking voltage source converter apparatus may comprise a plurality of voltage source converters connected to one another with the arrangement having fault blocking capability, in which case the method comprises a method of collectively controlling the combined VSCs. At least one of the voltage source converters of such an arrangement may itself be a fault blocking VSC.

Embodiments of the present invention thus operate a VSC in a non-blocked state after the identification of a need for a DC side interruption in order to dissipate the energy stored in the DC system. After at least some of the stored energy in the DC system is dissipated the VSC may then be isolated from the DC system and may, in some instances, be switched to a blocked state.

The DC side interruption may be any interruption to normal operation where it may be beneficial to dissipate the energy stored in the DC system. The DC side interruption may be a DC side fault and identification of a need for a DC side interruption may comprise detecting a DC side fault. In some instances however a DC side interruption may be a DC side shut-down, for instance as part of a planned shut-down for maintenance, in which case identification of a need for a DC side interruption may comprise receiving a DC side shut-down command.

In some embodiments the voltage order may be based on DC current flow so as to transfer at least some of the electrical energy stored in the connected DC system to the connected AC system. In other words the VSC may be operated to extract at least some of the stored energy from the DC system to the VSC which is then transferred to the AC system.

Operating the voltage source converter apparatus to transfer electrical energy from the DC system may comprise generating a voltage order with a polarity that is opposite to the polarity of DC current flow. The method may further comprise controlling the magnitude of the voltage order based on the magnitude of the DC current flow. In some embodiments the magnitude of voltage order may vary in at least one of a continuous or in a step-wise fashion with the magnitude of DC current, at least within a range between a maximum allowable positive voltage order and a maximum allowable negative voltage order.

In some embodiments however for some type of faults, e.g. for a pole-to-ground fault in a symmetrical monopole scheme, the occurrence of the fault may result in the healthy, i.e. non-faulted transmission line of the DC system being charged to a higher voltage. In such a case to extract the stored energy from the DC system the magnitude of the voltage order may be controlled so as to decrease over time from a value substantially equal to a monitored DC terminal voltage of the VSC. In other words the voltage order may be generated with an initial value that is substantially equal to the monitored voltage and then reduced over time to reduce the voltage of the DC line. The voltage order may be reduced to a define value which may, for instance be zero. The magnitude of the voltage order may be decreased at a rate such that a current flow in the DC system does not exceed an allowed maximum current rating. As will be explained in more detail later the current flow in the transmission line will depend on the capacitance of the line and the rate of change of voltage. The voltage order is varied so as to quickly bring the voltage down to the defined level but not so quickly as to result in the current flow exceeding a maximum current rating.

A voltage source converter will typically comprise a plurality of converter arms and in some embodiments each converter arm may comprise a chain-link circuit comprising a plurality of cells, wherein at least some of said plurality of cells comprise an energy storage element connected between terminals of the cell in a full H-bridge switch arrangement. In such embodiment voltage order may be a voltage order for such chain-link circuits.

As noted above after extracting at least some electrical energy stored in the connected DC system to the voltage source converter apparatus the method may further comprise subsequently isolating the voltage source converter apparatus from the DC system. The method may comprise switching the voltage source converter apparatus to a blocked state.

The method may comprise monitoring power flow from the DC system to the AC system. The step of subsequently switching the voltage source converter apparatus to a blocked state may be performed when the power flow is below a predetermined threshold. The step of subsequently switching the voltage source converter to the blocked state may be performed to substantially coincide with a zero crossing of current in the DC system.

In the event of a first type of DC fault the method may comprise, after identification of the DC side fault, switching the voltage source converter apparatus as an initial blocked state for a predetermined period prior to operating the voltage source converter to transfer electrical energy from the DC system to the AC system. In the initial blocked state at least some controllers of the voltage source converter apparatus are reset. The first type of fault may be a pole-to-pole DC fault.

In the event of a second type of DC fault the method may comprise operating the voltage source converter apparatus after identification of the DC side fault to transfer electrical energy from the DC system to the AC system as soon as the DC fault is identified. The second type of DC fault may be a pole-to-ground fault.

The method may be implemented by any suitable controller.

Aspects also apply to machine readable instructions such as software code or the like, which may be stored on a non-transitory storage medium, the machine readable code comprising instructions for performing the methods of any of the variants described above.

Aspects also relate to a controller for a fault blocking voltage source converter apparatus connected, in use, to an AC system and a DC system for power transmission, the controller being configured to:

control the voltage source converter after identification of a need for a DC side interruption based on a voltage order, to extract at least some electrical energy from the DC system to the voltage source converter apparatus.

The fault controller according to this aspect may be configured to implement the method in any of the variants described above. The controller may generate the voltage order based on DC current flow so as transfer at least some of the electrical energy stored in the connected DC system to the connected AC system.

The controller may comprise a voltage order generating module for generating a voltage order of opposite polarity to the polarity of DC current through the voltage source converter. The voltage order generating module may be configured to control the magnitude of the voltage order based on the magnitude of the DC current flow. The voltage order generating module may be configured to vary the magnitude of the voltage order in a substantially continuous manner for at least part of a range between a maximum positive voltage order and a maximum negative voltage order and/or may be configured to vary the magnitude of the voltage order in a stepwise fashion for at last part of said range.

The controller may be configured to switch the voltage source converter apparatus to a blocked state when power flow from the AC system to the DC system is below a predetermined threshold. The controller may therefore comprise a blocked state controller for monitoring said power flow against at least one predetermined threshold. The controller may be configured to switch the voltage source converter apparatus to the blocked state to substantially coincide with a zero crossing of current in the DC system.

The controller may be configured, in the event of a first type of DC fault, to switch the voltage source converter apparatus to an initial blocked state for a predetermined period prior to operating the voltage source converter apparatus to transfer electrical energy from the DC system. In the initial blocked state the fault controller may reset at least some controllers of the voltage source converter apparatus. The first type of fault may be a pole-to-pole DC fault. The fault controller may additionally or alternatively be configured in the event of a second type of DC fault to operate the voltage source converter apparatus to transfer electrical energy from the DC system to the AC system as soon as the DC fault is identified. The second type of DC fault may be a pole-to-ground fault.

Aspects of the invention also apply to a fault blocking voltage source converter apparatus having a controller as described in any of the variants above.

A voltage source converter of the apparatus may comprise a plurality of converter arms each converter arm comprising a chain-link circuit comprising a plurality of cells, wherein at least some of said plurality of cells comprise an energy storage element connected between terminals of the cell in a full H-bridge arrangement. In some embodiments each of the cells of the chain-link circuit of a converter arm may be connected in full H-bridge switch arrangement. The voltage source converter may be a converter of the modular multi-level converter (MMC) type or of the Alternate-Arm-Converter (AAC) type.

The voltage source converter apparatus may be part of an HVDC power distribution/transmission network and may in some embodiments be connected to DC transmission lines, e.g. cables or overhead lines, that may be many kilometres in length. At least some of the stored energy which is extracted from the DC system may comprise energy which is stored in the DC transmission lines, e.g. overhead lines and/or cables.

Aspects of the invention also relate to an HVDC power distribution/transmission system comprising at least one VSC as described above.

Embodiments of the invention may be implemented for any VSC topology or combination of VSCs that can provide both positive and negative voltages at the DC link.

BRIEF DESCRIPTION OF THE DRAWINGS

Embodiments of the invention will now be described by way of example only with respect to the accompanying drawings, of which.

DETAILED DESCRIPTION

Figure 1:
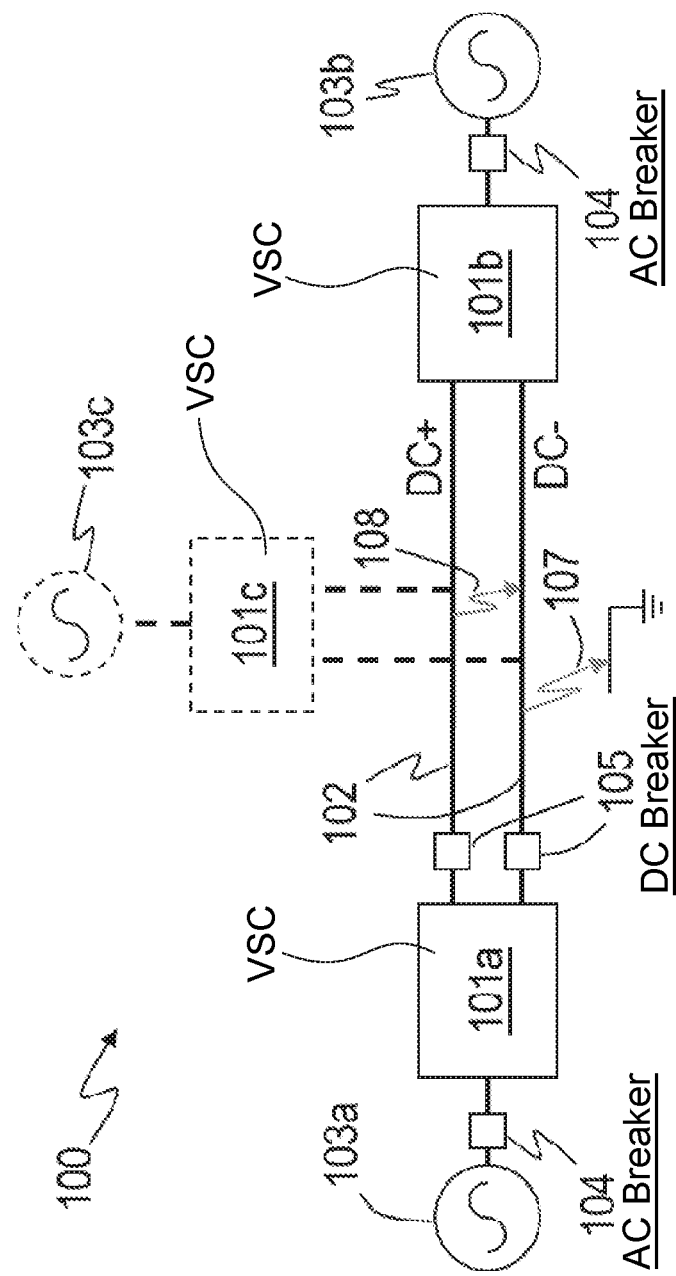
FIG. 1 illustrates one example of an HVDC network.

As mentioned above fault blocking VSCs with a plurality of full H-bridge cells in each converter arm may be used in DC networks to provide blocking of any AC contribution to a fault current in the event of a DC side fault.

Referring back to FIGS. 2 and 3 in the event of a DC fault the VSC is switched to a blocked state and in the blocked state all switching elements 207 of the full bridge cells are made non-conducting. Current may flow via the diodes of the switching elements 207 but the only flow path for current through the cell is via the energy storage element, i.e. capacitor 206, the voltage of which opposes current flow.

Typically therefore a controller 208 of a fault blocking VSC 200, 300 may switch the VSC to a blocked state as soon as a DC side fault is identified, i.e. an indication of a DC side fault is generated or received at the controller. This will relatively quickly block any AC contribution to the fault current.

It has been appreciated however that whilst switching a fault blocking VSC to a blocked state will quickly block any AC contribution to the fault current, the energy trapped in the DC system can keep a DC current flowing to the fault for some time after the VSC is blocked. The DC transmission lines will experience current and voltage oscillations as the energy trapped within the DC system moves between the capacitance and inductance of the DC system until dissipated within the DC system resistance. The decay time constant of the oscillations is determined by the inductance and resistance of the DC system and is typically of the order of several hundred milliseconds. This prolongs the flow of current in the DC system including the fault. The flow of current makes the isolation of the faulted equipment difficult unless fully capable DC breakers are used. In addition if the fault is due to a flashover on an overhead DC line the flashover arc will persist for as long as the current flows. Resumption of power transfer is therefore delayed for several seconds after the fault occurrence.

In general DC fault clearing processes require that current through the fault should be brought to zero and the system should then wait for a specified de-ionization time before re-activating the converter stations. Therefore, in order to allow for faster restarting of the DC system, the energy trapped in DC lines, e.g. overhead lines or cables, should be dissipated as soon as possible.

Embodiments of the present invention therefore operate a fault blocking VSC in a non-blocked state after a DC fault has been identified, with the VSC being operated to dissipate energy from the DC system and/or to damp oscillations in the DC system. In some embodiments the VSC may then be subsequently switched to a blocked state and/or otherwise isolated from the DC system. Operating the VSC in such a manner can allow for a more rapid isolation of the fault and/or extinction of the fault arc and thus a more rapid restart of power transmission. The same method may also be used in the event of other interruptions to normal DC side operation where it is wished to dissipate the energy stored in the DC system, e.g. the transmission lines. Such a DC side interruption may, for instance, be a shut-down of the DC transmission system, e.g. for maintenance or the like. The method may therefore be used when a need for a DC side interruption is detected, which could, for example, be identification of a fault or receipt of a fault indication signal or could be receipt of a shut-down command. The term "DC side interruption" shall thus be used herein to include faults or other events that require discharge of the DC transmission lines.

Figure 2:
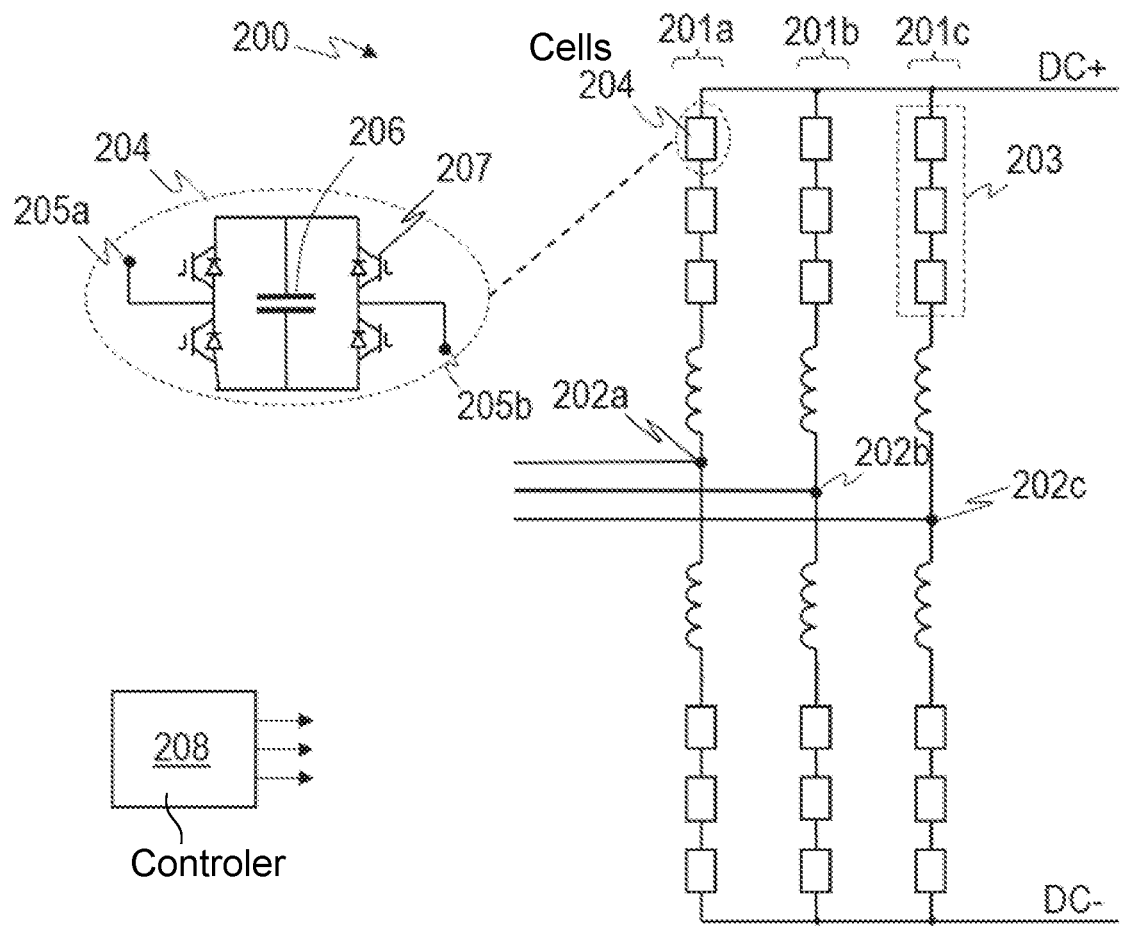
FIG. 2 illustrates one example of an MMC type VSC with fault blocking capability.
Figure 3:
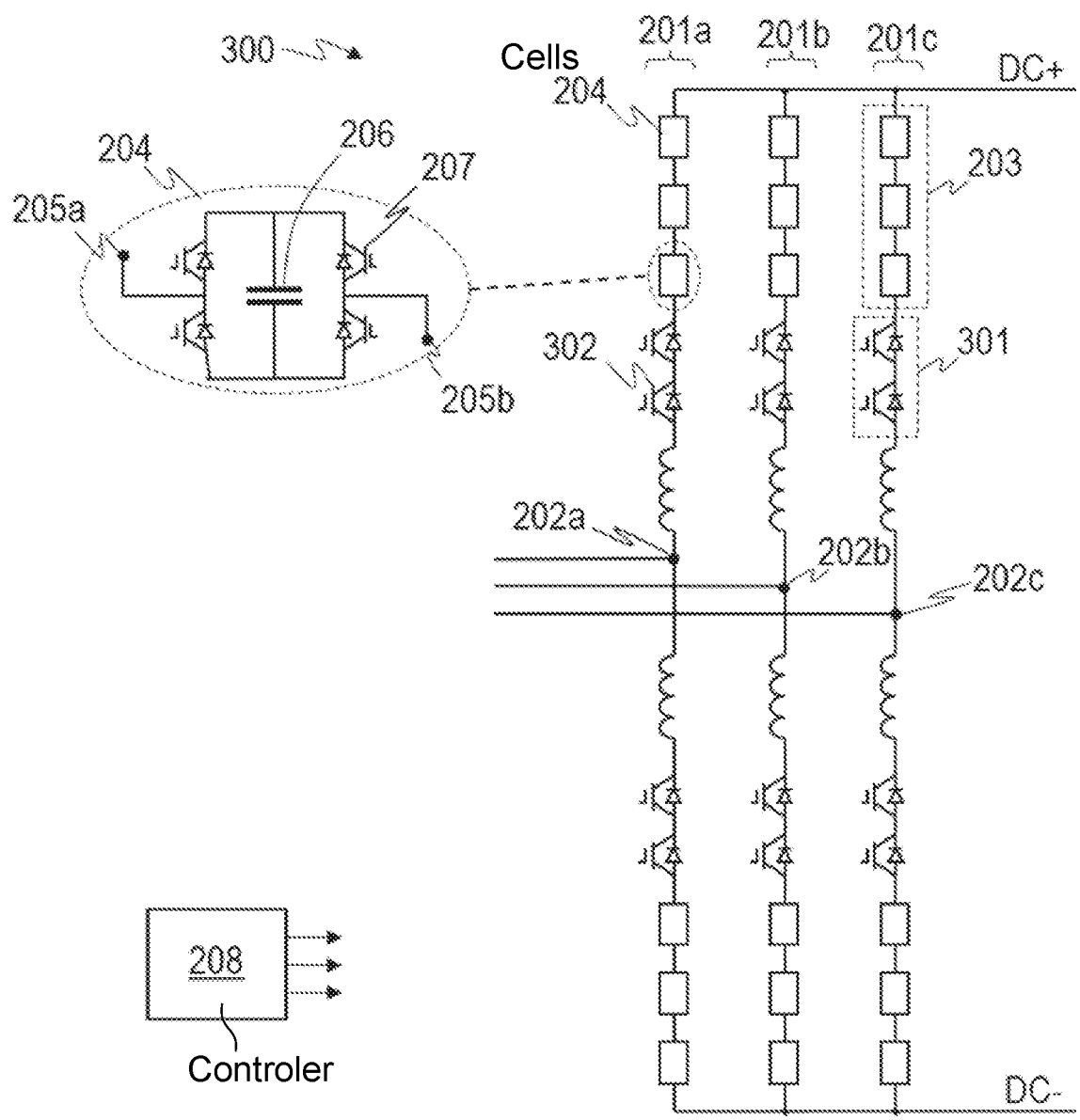
FIG. 3 illustrates one example of an AAC type VSC with fault blocking capability.
Figure 4:
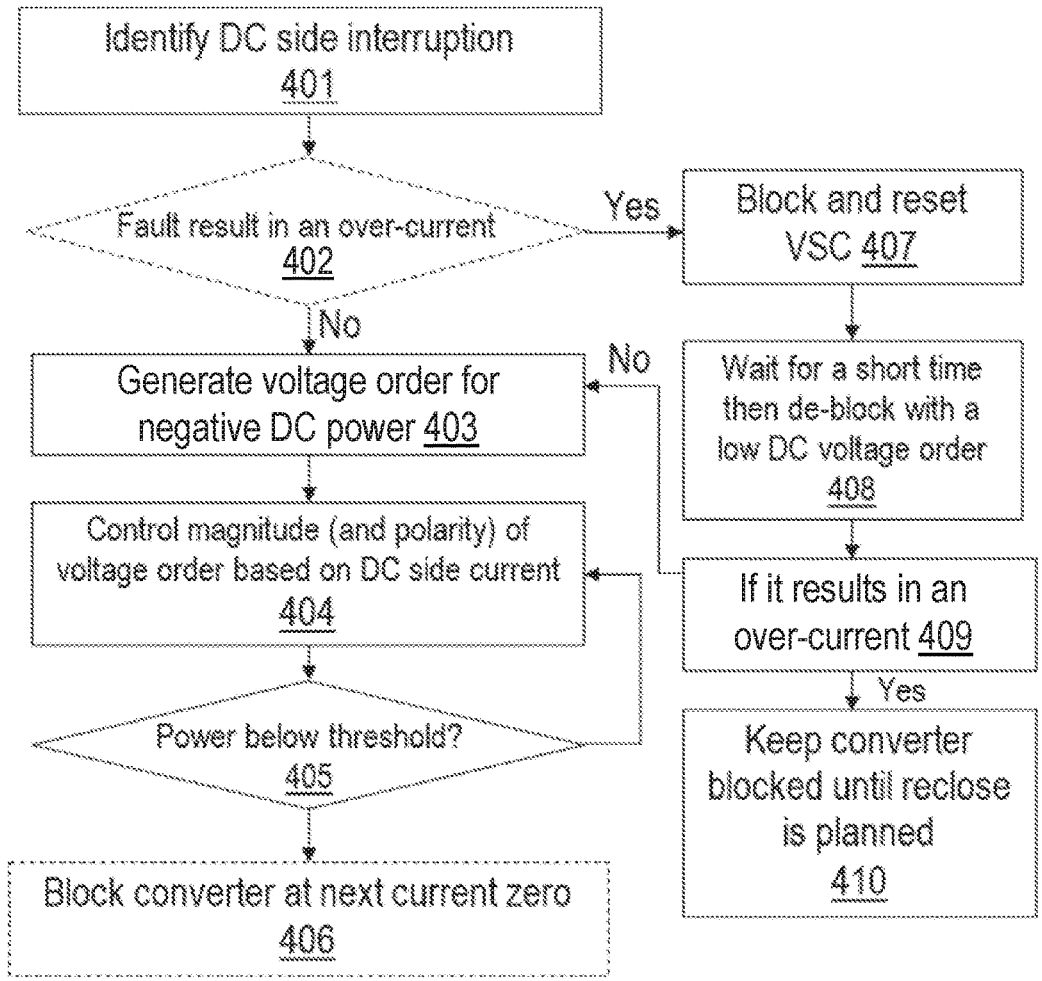
FIG. 4 illustrates a flow-chart of one example of a control method.

Thus in embodiments of the invention a fault blocking VSC, such as those illustrated in FIG. 2 or FIG. 3, may be controlled by its controller 208 to be operated in a non-blocked state after a DC side fault has been identified. FIG. 4 illustrates one example of a suitable method of control. The embodiments will be described with reference to a fault being the DC side interruption but the same general method may be used for other types of DC side interruption.

The method applies to a method of control in the event of a DC side interruption and thus normal operation according to the relevant operating conditions is maintained until a need for such interruption, e.g. a fault, is identified 401. One skilled in the art will be well aware of how a DC side fault may be identified. The DC fault may be identified by a controller of the VSC, e.g. by monitoring the properties and operation of the VSC and/or the controller may receive a control signal from some other monitoring apparatus indicating that a DC fault has been identified, and thus the controller identifying a fault may involve the controller receiving a suitable control signal and/or reading some status flag.

For some types of fault the occurrence of the fault could result in a relatively large current flowing through the VSC, which could result in an over-current, i.e. a current which would be above the normal, safe operating range of the VSC components. Such a fault could for example be a pole-to-pole fault. For some other types of fault however, for example a pole-to-ground fault, the current through the VSC may remain within the current capability of the converter. The method may therefore involve determining 402 whether the fault may result in an over-current. If so there may be some current limiting steps applied as will be described later.

In either case however the control will, in due course, progress to step 403 where an initial voltage order is generated to control the VSC such that resulting power flows from DC side, i.e. the DC power for the VSC is negative. Thus if the DC fault current is positive the applied DC voltage of the converter is negative or vice versa. As mentioned above the full H-bridge cells of the chain-links of the VSC 200 or 300 can be switched to generate either a positive or a negative voltage across the terminals of the cells. The controller thus controls the full bridge cells accordingly to give an appropriate voltage.

This then controls the VSC such that power flow is from the connected DC system to the VSC. This control will also transfer at least some of the stored electrical which is extracted from the DC system to the connected AC system. At least some of the energy extracted from the DC system may also be stored, at least for a period of time, in the capacitors of the VSC, i.e. the capacitors of the cells of the chain-link of the VSC. The VSC may thus absorb stored energy from the DC system, e.g. energy that would otherwise be circulating in the transmission lines and the VSC. This may result in a temporary increase of voltage of at least some cells of the VSC before a slower capacitor voltage control loop returns the capacitor voltages to their pre-fault levels, with energy being transferred to the connected AC system. It will therefore be appreciated that VSC is operated, after the DC side fault is detected, whilst still electrically connected to the AC system, i.e. the AC side breakers are not opened.

To provide oscillation damping the magnitude of the voltage order is controlled, 404, based on the magnitude of the fault current, whilst maintaining the appropriate polarity from power flow away from the DC system. Thus for a relatively high, positive DC current the voltage order will be relatively high and negative. As the DC side current reduces the magnitude of the voltage order will also be reduced. If the direction of the DC current oscillates, as may happen when the fault current magnitude has reduced, the polarity of the voltage order may change to maintain negative DC power flow. Thus, for example if the DC current becomes negative the voltage order will become positive, with the magnitude of the voltage order again being based on the magnitude of the DC side current.

Figure 5A:
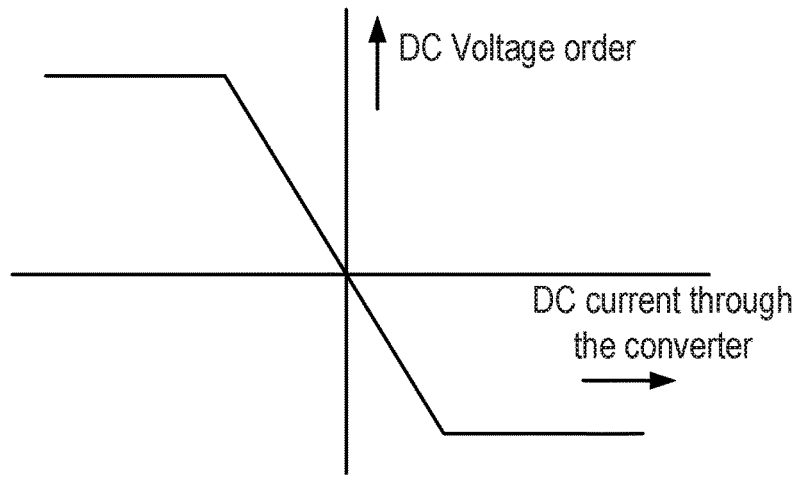
FIGS. 5A, 5B and 5C illustrate three examples of how the voltage order may vary.
Figure 5B:
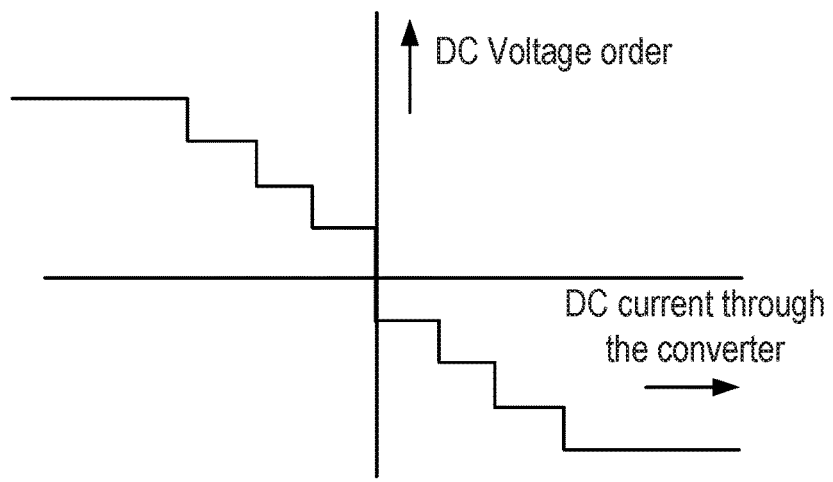

The transfer function between the DC side current and the voltage order may take a number of different forms. FIGS. 5A and 5B illustrate two possible examples. FIG. 5A shows that the transfer function may result in the voltage order varying substantially continuously and linearly between maximum positive and maximum negative values.

FIG. 5B illustrates a transfer function where the voltage order varies in a step-wise fashion, for instance based on a plurality of different current thresholds. It will be appreciated however that other transfer functions may be used, e.g. with both continuous regions and step-wise regions and/or with steps having different voltage resolution depending on the magnitude and/or the transfer function being generally non-linear for at least a region between the maximum positive and negative values.

Figure 5C:
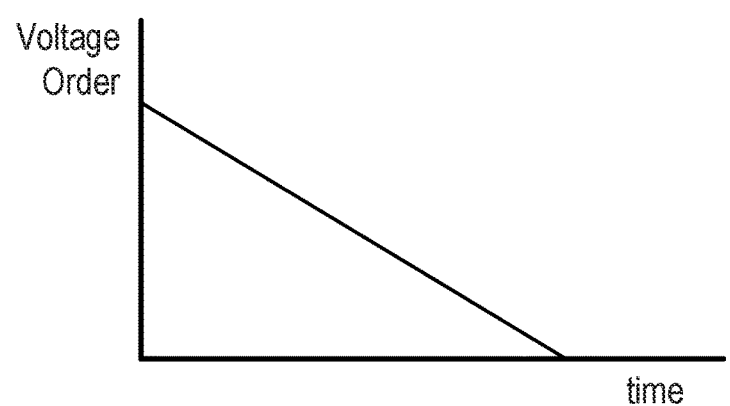

For symmetrical monopole scheme, in the case of a pole-to-ground fault, the healthy transmission line is charged to a higher voltage. The voltage order in this case may be generated as shown in FIG. 5C. Here the voltage order has a starting value that is substantially equal to the voltage monitored by the VSC at the healthy DC terminal. The value of the voltage order may be reduced over time with the slope of the variation of the voltage being governed by the maximum allowed converter current. For example for transmission cables the current is dictated by I=c. dv/dt, where C is the capacitance of the DC system and dv/dt is the voltage variation across the cable capacitance. The voltage order is varied over sufficient time so that the current flow does not violate the maximum allowed converter current rating during the DC interruption mode of operation. Such a DC voltage order transfers the stored energy in the cable to the converter apparatus.

In the example of FIG. 4 the power flow through DC side to AC side is continuously monitored 405 with respect to a threshold value, with the threshold being set relatively close to zero. The VSC is thus controlled to maintain a suitable voltage order such that the power flow from DC to AC reduces until the threshold value is reached, indicating that most of the energy in the DC system has been dissipated. At this point the VSC may be switched into a blocked state or otherwise isolated from the DC system. In some DC side interruptions there may be no need to switch the VSC to a blocked state.

In an embodiment, any isolation, e.g. the VSC being switched to the blocked state, is timed to coincide with a subsequent, e.g. the next, current zero of the DC side current. Switching the VSC to a blocked state at a current zero of the DC side current helps prevent or at least reduce any transients in current and/or voltage associated with blocking the converter.

As mentioned above in some embodiments the method may involve an initial step, after identification of a DC side fault, of determining whether the fault results in an over-current for the converter, which may for example be most likely for a pole-to-pole type fault. In the event that the fault does not result in an over-current, e.g. in the event of a pole-to-ground fault, the fault blocking VSC may be controlled to generate a voltage order to lead to a negative DC power with a magnitude that varies with DC side current as soon as the fault is identified.

In case of a pole-to-pole type fault or similar however the rate of rise of fault current may be higher which could potentially result in over-current flowing through the converter before the VSC control action could provide a voltage order which starts to limit this current.

Therefore, in some embodiments if a fault leading to an over-current, e.g. a pole-to-pole fault, is detected the VSC may initially and immediately be switched, 407, into a blocked state. In the blocked state the VSC controller functions (e.g. voltage and current loop control etc) may be reset, with the exception of any control functions associated with synchronisation with the connected AC system, e.g. a phase-locked loop (PLL) or the like. After a short predetermined time, say of the order of 15 ms or so, the VSC is de-blocked 408, i.e. control of the switching elements of the cells is recommenced. A low voltage order, say of the order of about 0 or −0.1 p.u. may be given to the converter to limit the DC fault current. When the VSC is de-blocked with the low voltage order it may again be determined 409 whether the fault results in an over-current. If the current is now within the acceptable current limit for the VSC the method may progress as described above, i.e. from step 403. However if de-blocking the VSC with a relatively low voltage order still results in an over-current this may represent a fault relatively close to the converter station. For a pole-to-pole fault relatively close to the converter station there may typically not be much energy stored in the section of DC link between the VSC and the fault to be dissipated and thus the VSC may be maintained 410 in a blocked state until restart of the DC link. In such a scenario it will be appreciated that another VSC at the far end of the DC link may operate according to embodiments of the present invention to dissipate energy in the DC link on that side of the fault.

Thus in the case of, for example, a pole-to-pole fault the VSC may be initially blocked for a short period to avoid an over-current but then subsequently operated after identification of the DC side fault and before the fault is cleared in order to remove energy from the DC side more quickly and damp oscillations. Once the DC side energy has been dissipated the VSC may then be blocked again to allow fault clearing.

It will be appreciated that in some embodiments the initial blocking may occur only if the rise of fault current immediately after the DC side fault is above some threshold value and/or results in an over-current or indicates that an over-current is likely.

Figure 6:
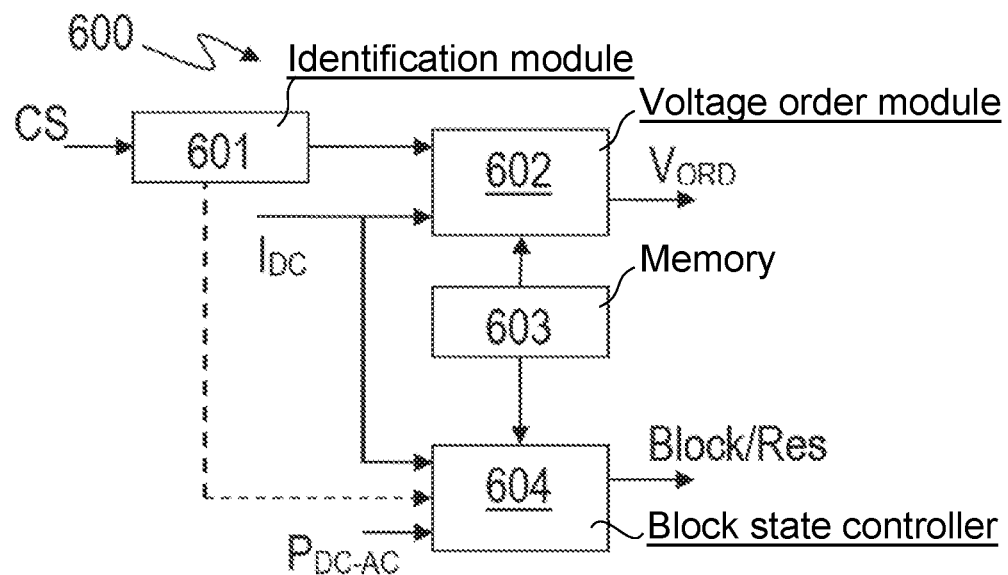
FIG. 6 illustrates a controller for a fault blocking VSC.

FIG. 6 illustrates a controller 600 for controlling a fault block VSC according to an embodiment of the invention.

The controller has an identification module 601 for receiving at least one control signal CS. The identification module may be operable to detect occurrence of a DC side fault and may, for instance, receive signal indication of the current and/or voltage of the VSC, e.g. at DC terminals in order to determine when a DC fault is occurring. In some embodiments however the identification module may receive a control signal from some other monitoring apparatus indicating that a DC side interruption is required, i.e. a DC fault is occurring or for receiving a shut-down request.

In the event of a fault the identification module may signal a voltage order module 602 to generate a voltage order $V_{ORD}$ with a polarity and magnitude based on the DC current $I_{DC}$. The voltage order module may apply a transfer function as described above which may for instance be stored in a memory 603, e.g. as a look-up table or like. A blocked state controller 604 may then monitor the power flow $P_{DC-AC}$ until it reaches a predetermined threshold, which may also be set in memory such as 603, before generating a block order to switch the VSC into a blocked state. The blocked state controller 604 may also monitor the DC current $I_{DC}$ such that the VSC is switched to a blocked state at a time that substantially corresponds to the time of a zero crossing of the DC current. In some embodiments the identification module 601 may also signal the blocked state controller 604 to enter a blocked state for a short period as soon as a fault that may lead to, or has resulted in, an over-current is detected.

One skilled in the art will appreciate that may of the functions of the modules of FIG. 6 may be distributed through the normal control apparatus of a VSC controller and may be implemented by dedicated hardware, e.g. circuit components and/or may be at least partly implemented by various processing routines running on suitable processing components, such as general purpose processors or FPGA arrays or the like.

Embodiments of the invention thus provide a method whereby stored energy in a DC system in the event of a DC side fault can be more rapidly dissipated than otherwise would be the case, thus allowing for more rapid fault clearing and re-start.

In the case of pole to ground fault in a symmetrical monopole scheme, an additional advantage of this approach is that as the DC scheme will be restarting from zero voltage and therefore the two poles will be symmetrical about ground potential. This means that other voltage equalising equipment (e.g. Dynamic Braking Resistors) are not required.

It will be appreciated that whilst having been explained principally with respect to the MMC converter of FIG. 2 and the AAC converter of FIG. 3, embodiments of the present invention may be applied to any type of VSC converter which can block fault current and can operate with both positive and negative DC output voltages.

The discussion above has focussed on a single VSC being arranged between the terminal of the DC link. Embodiments of the invention may additionally be implemented with various arrangements of multiple VSCs, for example with converters with series, parallel and both series and parallel combination in which at least one converter is capable of blocking DC fault current and operate with both positive and negative DC voltages. As used herein the term voltage source converter apparatus shall refer to an apparatus connected to an AC system and to DC terminals of a DC system, i.e. between DC link terminals, that may comprise a single VSC (as in the embodiments described above) or multiple VSCs connected to one another.

Figure 7:
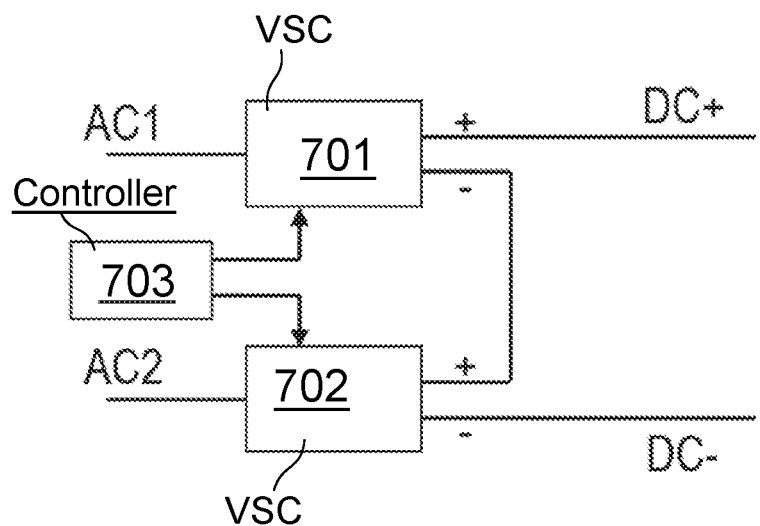
FIG. 7 illustrates a voltage source converter apparatus comprising a plurality of VSCs connected between terminals of a DC link.

For example FIG. 7 illustrates that a bipolar DC link may be provided with first and second DC lines DC+ and DC− respectively connected to a voltage source converter apparatus 700. In this example the VSC apparatus 700 comprises a first VSC 701 connected to the first DC line (DC+) and a second VSC 702 connected to the second DC line (DC−). In this example the first and second VSCs are connected in series, i.e. one of the DC terminals of the first VSC is connected to a DC terminal of the second VSC, with the other DC terminals of the first and second VSCs being connected to the first and second DC lines, DC+ and DC−, respectively. Each of the first and second VSCs has its own AC connection, which may be three phase and may be connected to the same AC system.

Collectively the first and second VSCs are capable of producing either a positive or a negative voltage across the DC link. In this embodiment at least one of the first and second VSCs is itself capable of producing a positive or negative voltage across its DC terminals, e.g. is a fault-blocking converter. The other VSC may be a non-fault blocking converter. In normal operation both VSCs will typically produce a voltage of the same polarity, with the voltages from each VSC summing to produce the voltage across the DC link, i.e. the voltage between DC+ and DC−. In a fault situation however a controller 703 may generate an overall voltage order for the DC link based on the magnitude and polarity of the DC current as described above and control each VSC accordingly. A voltage source converter apparatus having multiple VSCs may be controlled in any of the ways discussed above in relation to FIGS. 4 to 6.

To demonstrate the principles of embodiments of the invention a simulated HVDC system was subjected to a simulated ground fault using conventional control methodologies and also control methodologies according to embodiments of the invention.

Figure 8:
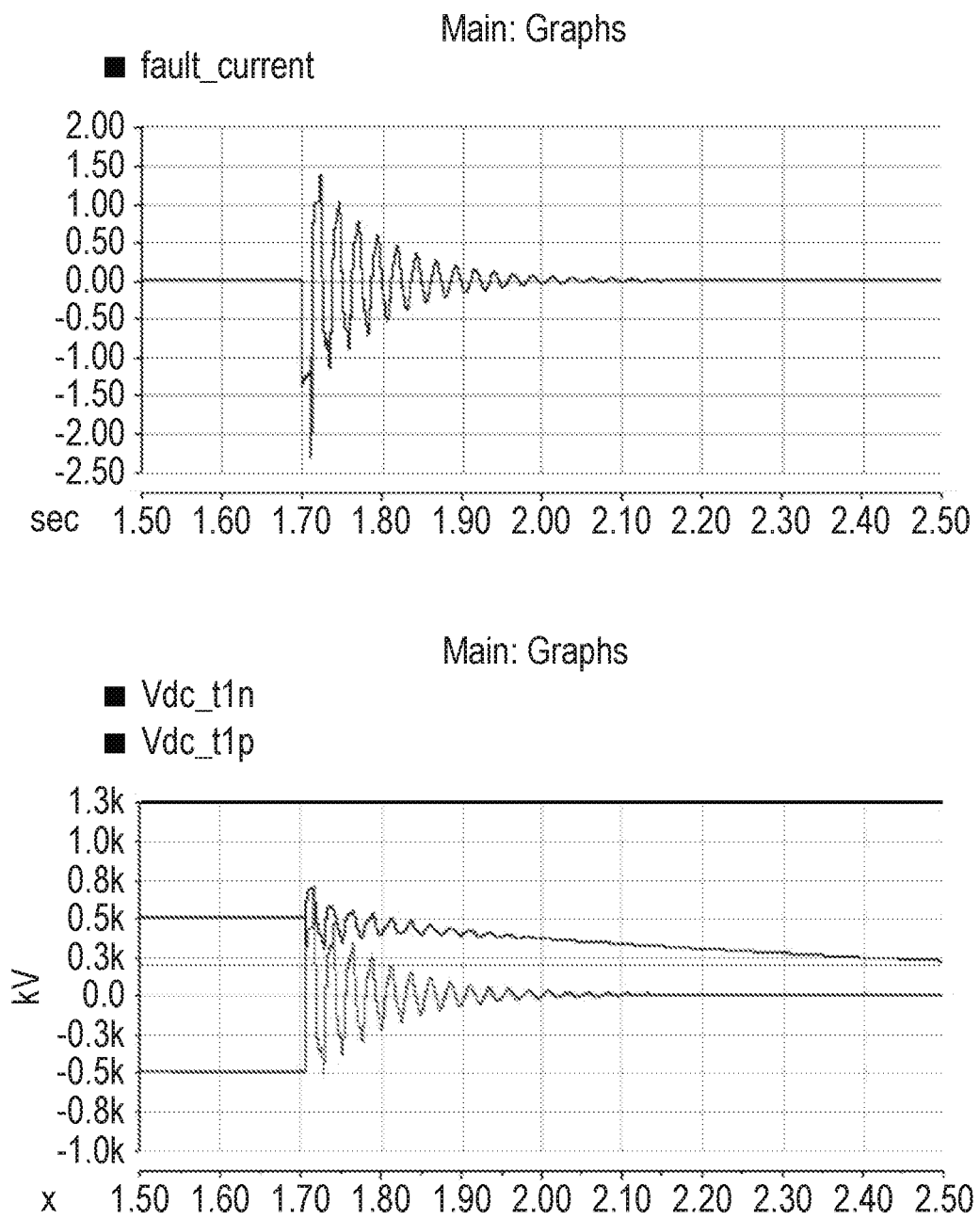
FIG. 8 illustrates simulated current and voltage waveforms for an HVDC system in the event of a pole-to-ground fault with a fault blocking VSC operated according to the conventional methodology.

FIG. 8 illustrates waveforms for the DC side current (top plot) and the DC line voltages (lower plot) for a fault blocking VSC where a pole-to-ground fault occurs at a time t=1.7 s and the fault blocking VSC is immediately switched to, and maintained in, a blocked state, i.e. there is no operation of the VSC after the fault is identified.

It can be seen that there is a significant amount of oscillation in current and voltage which persists for several hundred milliseconds.

Figure 9:
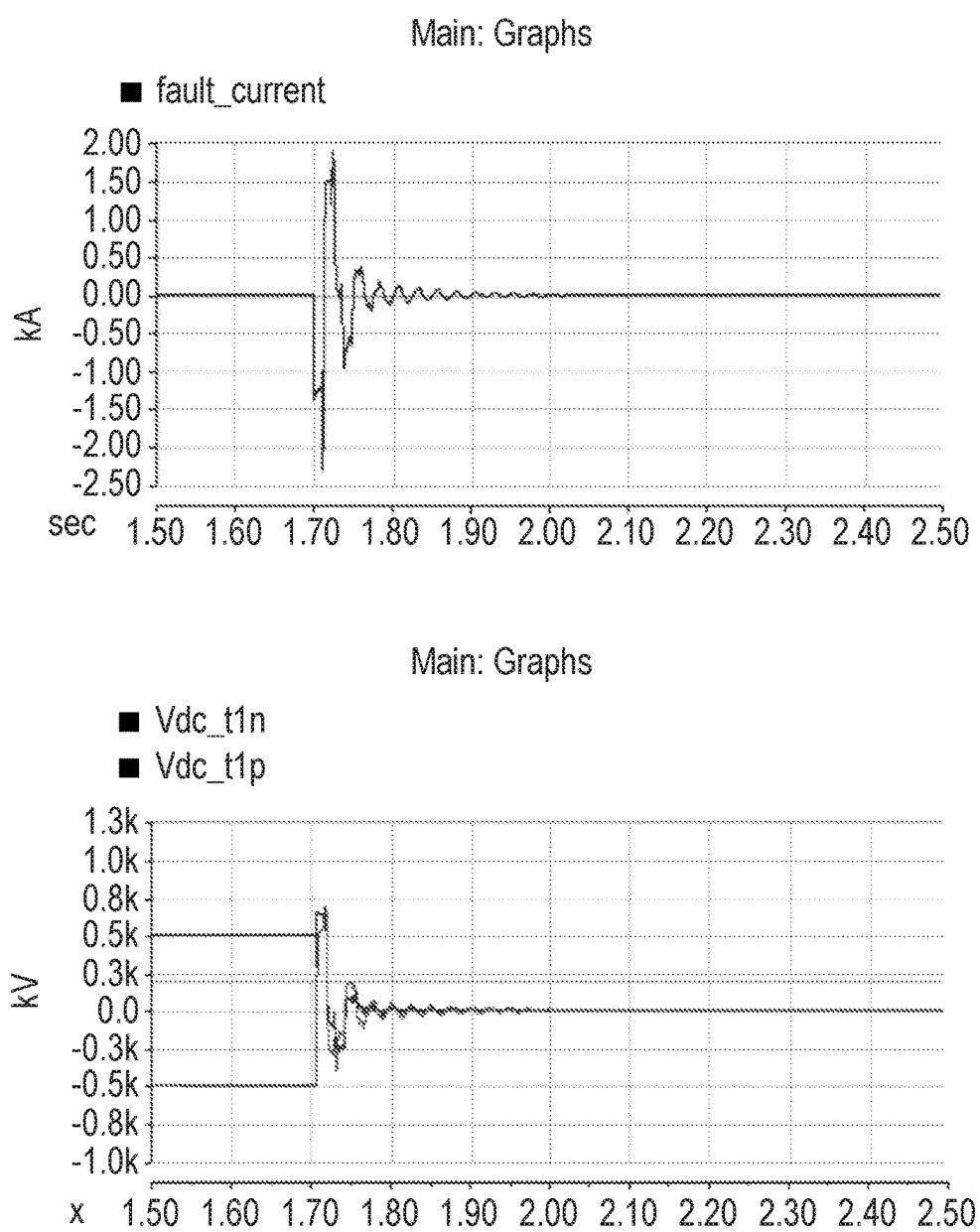
FIG. 9 illustrates simulated current and voltage waveforms for an HVDC system in the event of a pole-to-ground fault with a fault blocking VSC operated.

FIG. 9 shows the current and voltage waveforms for the same simulated system and the same simulated DC fault as FIG. 8 but where a fault control method according to embodiments of the present invention is applied. It can be seen that both the current and voltage oscillation decay much more rapidly and the fault current is brought to near zero on a much faster timescale.

Figure 10:
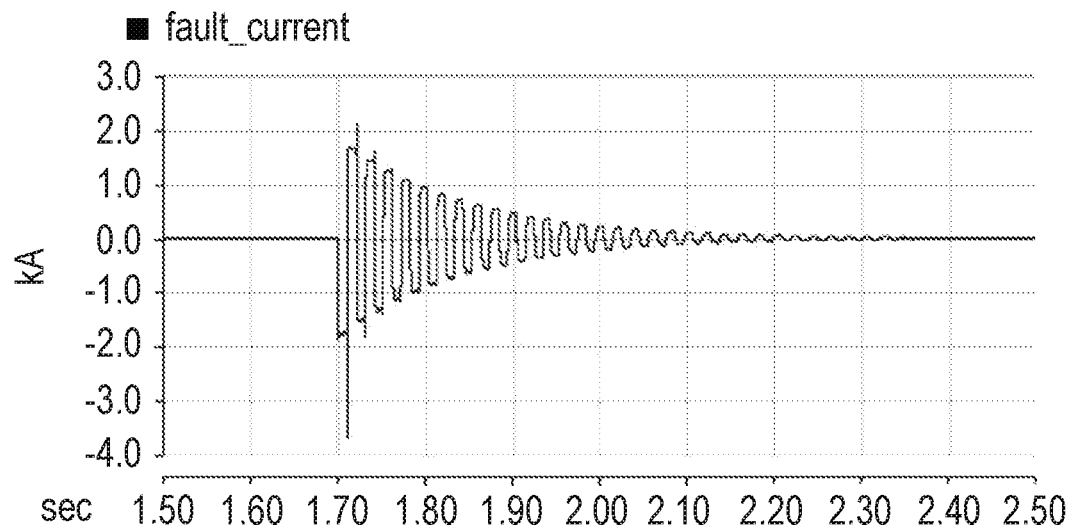
FIG. 10 illustrates simulated current and voltage waveforms for an HVDC system in the event of a pole-to-pole fault with a fault blocking VSC operated.
Figure 10:
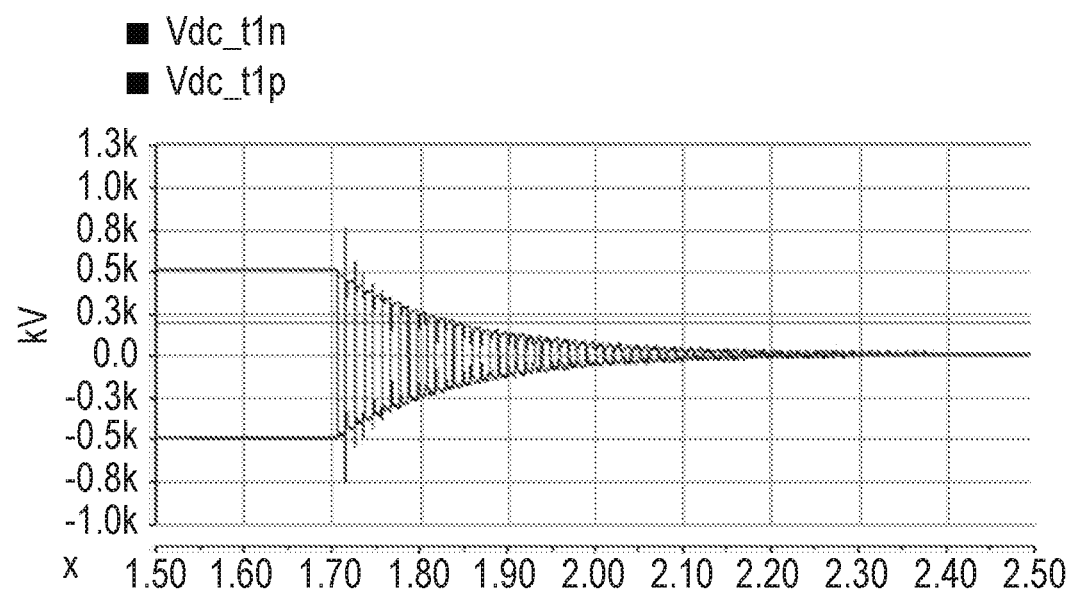

FIG. 10 shows instead a simulated pole-to-pole fault occurring at time t=1.7 s with the conventional approach of the fault blocking VSC being immediately switched to a blocked state and maintained in a blocked state. Again it can be seen that there is significant current and voltage oscillation that persists for a relatively long time.

Figure 11:
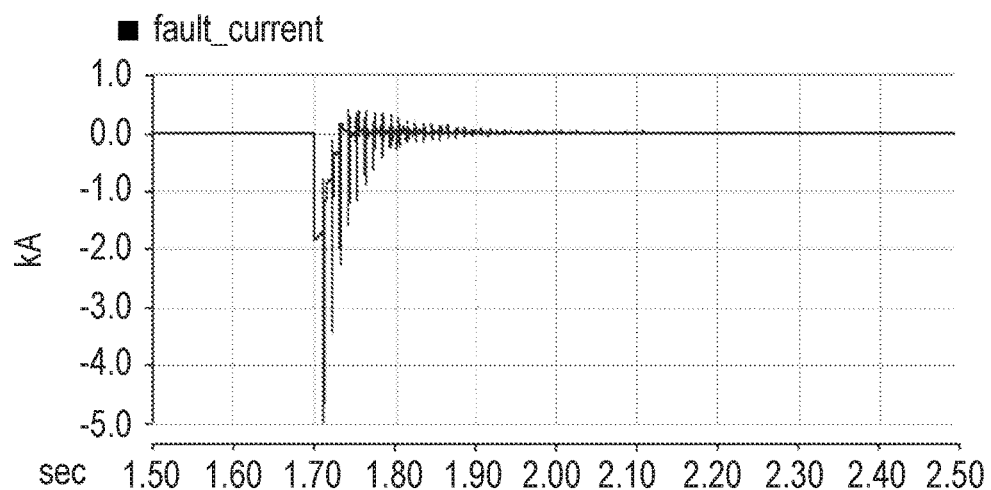
FIG. 11 illustrates simulated current and voltage waveforms for an HVDC system in the event of a pole-to-pole fault with a fault blocking VSC operated.
Figure 11:
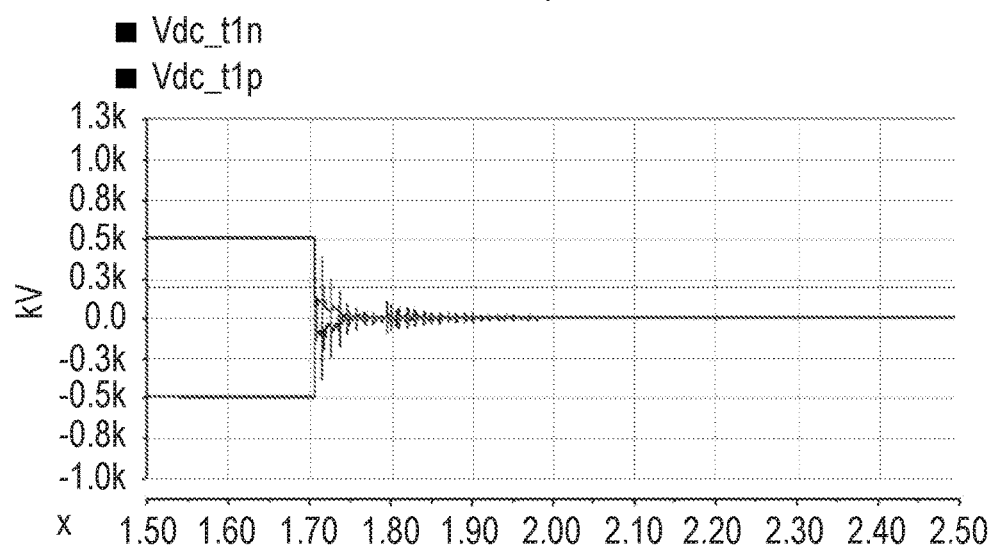

FIG. 11 shows the current and voltage waveforms for the same simulated system and the same simulated pole-to-pole DC fault as FIG. 10 but where a fault control method according to embodiments of the present invention is applied. In the example of FIG. 11 the VSC is not switched to an initial blocked state, i.e. the method of FIG. 4 progresses from steps 401 to 403. It can be seen that the voltage and current oscillation is damped more quickly than with the conventional method illustrated with respect to FIG. 10. However the initial fault current experienced is higher than with the conventional method.

Figure 12:
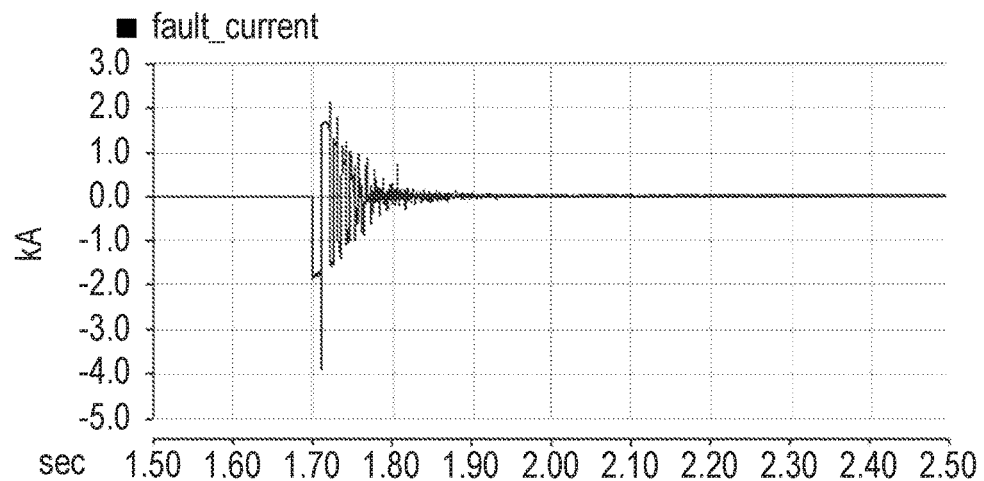
FIG. 12 illustrates simulated current and voltage waveforms for an HVDC system in the event of a pole-to-ground fault with a fault blocking VSC operated with the VSC being initially switched to a blocked state for a short period.
Figure 12:
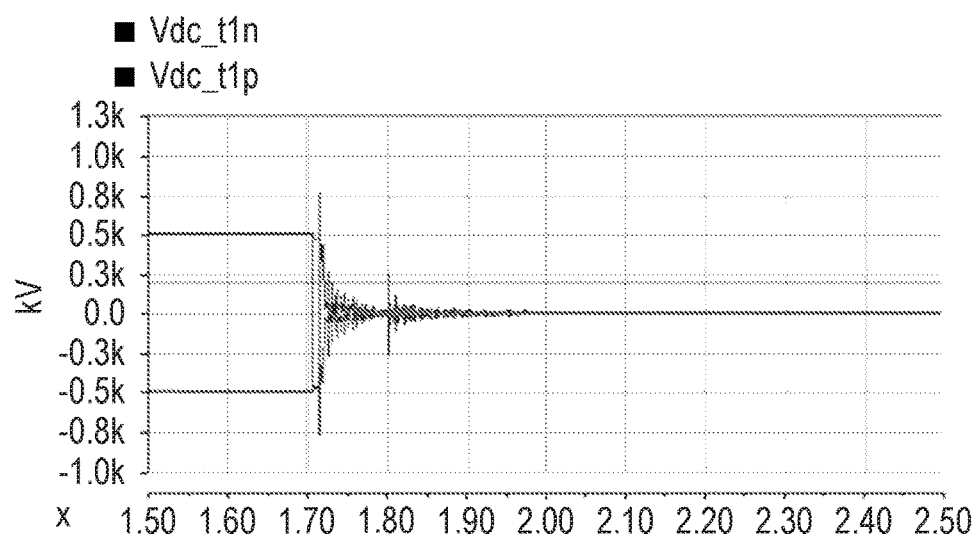

Thus as described above the control method may involve initially blocking the VSC and then de-blocking with a low voltage order. FIG. 12 shows the current and voltage waveforms simulated using such a method, i.e. including steps 407 and 408 of FIG. 4. It can be seen that in this instance the maximum fault current is limited and is no greater than with the conventional approach indicated in FIG. 10 but that subsequent de-blocking of the VSC and operation according to the methods described above does more rapidly reduce the fault current to near zero.

Embodiments of the invention thus provide methods and apparatuses for control of VSCs, and in particular fault blocking VSCs with full H-bridge cells, in the event of a DC side interruption such as a fault situation. Embodiments of the present invention operate the VSC after a DC fault is identified in order to more rapidly dissipate any stored energy in the DC side to provide more rapid fault clearing.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a fault blocking voltage source converter apparatus which is, in use, connected to an AC system and a DC system for power transmission, the method comprising:
   Identifying a need for a DC side interruption;
   after the identification of the need for a DC side interruption, operating the fault blocking voltage source converter apparatus based on a DC voltage order;
   generating the DC voltage order based on DC current flow, the generated DC voltage order having a polarity that is opposite to a polarity of the DC current flow; and
   extracting, through the operation of the fault blocking voltage source converter, at least some electrical energy stored in the connected DC system through the fault blocking voltage source converter apparatus to the connected AC system.

2. The method as claimed in claim 1 comprising controlling a magnitude of the DC voltage order based on a magnitude of the DC current flow.

3. The method as claimed in claim 2 wherein the magnitude of the DC voltage order varies at least one of continuously or in a step-wise fashion with the magnitude of DC current between a maximum allowable positive DC voltage order and a maximum allowable negative DC voltage order.

4. The method as claimed in claim 1 comprising controlling a magnitude of the DC voltage order to decrease over time from a value substantially equal to a monitored DC terminal voltage.

5. The method as claimed in claim 1 wherein a magnitude of the DC voltage order is decreased at a rate such that the current flow in the DC system does not exceed an allowed maximum current rating.

6. The method as claimed in claim 1 wherein the fault blocking voltage source converter apparatus comprises a plurality of converter arms, each converter arm comprising a chain-link circuit comprising a plurality of cells, wherein at least some of said plurality of cells comprise an energy storage element connected between terminals of the cell in a full H-bridge switch arrangement, wherein said DC voltage order is a voltage order for said chain-link circuits.

7. The method as claimed in claim 1 wherein said fault blocking voltage source converter apparatus comprises a plurality of voltage source converters connected to one another.

8. The method as claimed in claim 1 wherein after extracting at least some electrical energy stored in the connected DC system to the fault blocking voltage source converter apparatus the method further comprises subsequently isolating the fault blocking voltage source converter apparatus from the DC system.

9. The method as claimed in claim 1 wherein after extracting at least some electrical energy stored in the connected DC system to the fault blocking voltage source converter apparatus the method further comprises switching the fault blocking voltage source converter apparatus to a blocked state.

10. The method as claimed in claim 9 comprising monitoring power flow from the DC system and switching the fault blocking voltage source converter apparatus to a blocked state when the monitored power flow is below a predetermined threshold.

11. The method as claimed in claim 9 wherein the step of switching the fault blocking voltage source converter apparatus to a blocked state is performed to substantially coincide with a zero crossing of current in the DC system.

12. The method as claimed in claim 1 wherein the DC side interruption is a DC side fault and identification of a need for a DC side interruption comprises detecting a DC side fault.

13. The method as claimed in claim 12 wherein in the event of a first type of DC side fault the method comprises, after identification of the DC side fault, switching the fault blocking voltage source converter apparatus to an initial blocked state for a predetermined period prior to operating the fault blocking voltage source converter apparatus to transfer electrical energy from the DC system.

14. The method as claimed in claim 13 wherein when in the initial blocked state at least some controllers of the fault blocking voltage source converter apparatus are reset.

15. The method as claimed in claim 12 wherein in the event of a second type of DC fault the method comprises operating the fault blocking voltage source converter apparatus after identification of the DC side fault to transfer electrical energy from the DC system to the AC system as soon as the DC side fault is identified.

16. The method as claimed in claim 1 wherein the DC side interruption is a DC side shut-down and the identification of the need for a DC side interruption comprises receiving a DC side shut-down command.

17. A controller for a fault blocking voltage source converter apparatus connected, in use, to an AC system and a DC system for power transmission, the controller being configured to:

identify, based on a voltage order, a need for a DC side interruption;

after the identification of the need for a DC side interruption, operate the fault blocking voltage source converter apparatus based on a DC voltage order;

generate by a DC voltage order generating module the DC voltage order based on DC current flow, the generated DC voltage order having a polarity opposite to a polarity of the DC current flow through the fault blocking voltage source converter; and extract, through the operation of the fault blocking voltage source converter, at least some electrical energy stored in the connected DC system through the voltage source converter apparatus to the connected AC system.

18. The controller as claimed in claim 17 wherein the controller generates the DC voltage order based on the DC current flow to transfer at least some of the electrical energy stored in the connected DC system to the connected AC system.

19. The controller as claimed in claim 17 wherein the DC voltage order generating module is configured to control a magnitude of the DC voltage order based on a magnitude of the DC current flow.

20. The controller as claimed in claim 17 wherein the fault controller is configured to switch the fault blocking voltage source converter apparatus to a blocked state when power flow from the AC system to the DC system is below a predetermined threshold.

* * * * *